United States Patent
Hayashi

(10) Patent No.: US 8,139,300 B2
(45) Date of Patent: Mar. 20, 2012

(54) MAGNETIC RECORDING MEDIUM EVALUATION APPARATUS AND EVALUATION METHOD

(75) Inventor: Takashi Hayashi, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 13/162,749

(22) Filed: Jun. 17, 2011

(65) Prior Publication Data

US 2011/0242693 A1    Oct. 6, 2011

Related U.S. Application Data

(62) Division of application No. 12/457,004, filed on May 28, 2009, now Pat. No. 7,995,299.

(30) Foreign Application Priority Data

May 30, 2008    (JP) .................................. 2008-142637

(51) Int. Cl.
G11B 27/36 (2006.01)
(52) U.S. Cl. .......................................... 360/31; 360/55
(58) Field of Classification Search .................. None
See application file for complete search history.

(56) References Cited

U.S. PATENT DOCUMENTS

| 4,344,093 A | 8/1982 | Huber |
| 6,046,873 A | 4/2000 | Hori et al. |
| 6,385,255 B1 | 5/2002 | McLaughlin et al. |
| 7,773,681 B2 | 8/2010 | Koo et al. |

*Primary Examiner* — Jason Olson

(74) *Attorney, Agent, or Firm* — Rabin & Berdo, P.C.

(57) ABSTRACT

This invention provides a magnetic recording medium evaluation apparatus and evaluation method which yield results having good correlation with error rate measurements even when comparing media with different structures. Signals from a function generator are recorded in a magnetic recording medium. The recording signals are also passed through a first digital filter to obtain ideal restored signals. Reproduced signals from the magnetic recording medium are sampled in synchronization with the output from the function generator, and the discrete signals are passed through a second digital filter to obtain restored signals. The outputs from the first and second digital filters are input to an operational amplifier, and the difference between the restored signals and the ideal restored signals is taken for each sampling of the recording signals. The signal-to-noise ratio of the ideal restored signal to the average of the absolute value of this difference is used to evaluate signal quality.

10 Claims, 4 Drawing Sheets

MAGNETIC RECORDING MEDIUM EVALUATION APPARATUS AND EVALUATION METHOD

This is a Divisional of co-pending U.S. application Ser. No. 12/457,004, filed on May 28, 2009, the entire disclosure which is incorporated by reference. This application also claims foreign priority benefits under 35 USC 119 of Japanese patent application Ser. No. 2008-142637, filed May 30, 2008, the entire disclosure of which also is incorporated by reference.

BACKGROUND OF THE INVENTION

1. Field of the Invention

This invention relates to a magnetic recording medium evaluation apparatus and a magnetic recording medium evaluation method, and more specifically, relates to a magnetic recording medium evaluation apparatus for a hard disk magnetic recording medium, and to an evaluation method for such a medium.

2. Description of the Related Art

In magnetic recording and reproduction systems used in hard disk devices, PRML (partial response maximum-likelihood) technology is employed to perform high-density recording and reproduction. On the other hand, in the evaluation of magnetic heads and magnetic recording media used to construct magnetic recording and reproduction systems, recording is normally performed at fixed magnetization inversion intervals by causing inversion of the recording magnetic field of the magnetic recording head at equal time intervals in the magnetic recording medium rotating at constant velocity, and performing frequency-axis analyses of electrical signals obtained by a magnetoresistive reproduction element, again during rotation at constant velocity, to evaluate analog signal quality. In particular, the signal-to-noise ratio evaluated by a spectrum analyzer (MF-SpiSNR) when signals are recorded and reproduced at twice the interval of the specified magnetization inversion interval is widely used for evaluations of the signal quality of a magnetic recording and reproduction system, or of a magnetic recording medium, when the error rate is not directly measured. However, there are cases in which a highly customized dedicated LSI is used to perform random-pattern recording and reproduction in a specified channel, to evaluate the error rate directly.

While the above-described MF-SpiSNR is closely correlated with the error rate in relative evaluations of magnetic recording media when the macroscopic structure is substantially the same and processes are different, when performing evaluations of magnetic recording media with different structures, there is a problem that good correlation cannot necessarily be obtained. In order to measure directly the error rates for magnetic recording media with different structures, a dedicated signal processing circuit is required in addition to an analog signal evaluation system, and so there is a problem that such a magnetic recording medium evaluation apparatus is of limited applicability.

SUMMARY OF THE INVENTION

This invention addresses the above problems, and has as an object the provision of a magnetic recording medium evaluation apparatus and evaluation method, which do not require a sophisticated signal processing circuit of limited applicability such as is required for error rate measurements, and which yields good correlation with error rates even when comparing media with different structures.

In order to attain these objects, a first aspect of the invention disclosed is a magnetic recording medium evaluation apparatus, comprising a spin stand which rotates the magnetic recording medium; a magnetic recording/reproduction head; a mechanism to position the magnetic recording/reproduction head above the magnetic recording medium; a signal generator for generating arbitrary recording signals $x_n$; a recording circuit which processes the recording signals $x_n$ for recording on the magnetic recording medium using the magnetic recording/reproduction head; and a reproduction circuit for providing, as reproduced signals $y_k$, signals acquired from the magnetic recording medium using the magnetic recording/reproduction head, at a fixed sampling interval in synchronization with the recording signals $x_n$. This embodiment of the invention also includes first and second digital filters. The first digital filter is a digital filter to which the recording signals $x_n$ are input, which is represented by coefficients $c_{nk}$ satisfying the relationship $z_n = \Sigma c_{nk} x_k$, and which outputs ideal restored signals $z_n$ when the recording signals $x_n$ are recorded. The second digital filter is a digital filter to which the reproduced signals $y_k$ are input, which is represented by coefficients $d_{nk}$ satisfying the relationship $z'_n = \Sigma d_{nk} y_k$ for restored signals $z'_n$, the coefficients $d_{nk}$ being the components of a matrix $D = CA^{-1}$ obtained by determining the relationship $y_n = \Sigma a_{nk} x_k$ between the previously sampled reproduced signals $y_k$ and the recording signals $x_n$, calculating an inverse matrix $B = A^{-1}$ of a square matrix A the components of which are the coefficients $a_{nk}$, and multiplying from the right a matrix C the components of which are the coefficients $c_{nk}$ by a matrix $B = A^{-1}$. The apparatus further includes comparison means for determining the difference between the output of the first digital filter and the output of the second digital filter; and calculating means for calculating a signal-to-noise ratio by taking an average of the absolute value of the difference determined by the comparison means as the denominator, and the amplitude of the ideal restored signals $z_n$, as the numerator. In this first aspect of the invention, the recording circuit preferably comprises a digital to analog converter and the reproduction circuit preferably comprises an analog to digital converter. An operational amplifier is preferably used to perform the function of the comparison means. The first digital filter and the second digital filter may be implemented in software running on a microcomputer.

A second aspect of the invention disclosed is a magnetic recording medium evaluation apparatus, comprising a spin stand which rotates a magnetic recording medium; a magnetic recording/reproduction head; a mechanism to position the magnetic recording/reproduction head above the magnetic recording medium; and a signal generator for generating square-wave signals at an arbitrary frequency $f_s$. In this embodiment of the invention, there is a recording circuit which processes the square-wave signals at frequency $f_s$ for recording on the magnetic recording medium using the magnetic recording/reproduction head; and a spectrum analyzer which performs frequency analysis of reproduced signals $y_k$ reproduced by the magnetic recording/reproduction head, and generates a power spectrum of the waveform of the reproduced signals $y_k$. This embodiment also includes storage means for storing a function $E_f$ obtained, when the relationship between the recording signals $x_n$ and signals to be restored $z_n$ is expressed by $z_n = \Sigma c_{nk} x_k$ and the relationship between the reproduced signals $y_k$ and the recording signals $x_n$ is expressed by $y_n = \Sigma a_{nk} x_k$, by calculating a matrix B which has $b_{nk}$ as components and which is an inverse matrix $B = A^{-1}$ of a square matrix A the components of which are the coefficients $a_{nk}$, multiplying from the right a matrix C the components of which are coefficients $c_{nk}$ by a matrix $B = A^{-1}$ to determine a matrix $D=CA^{-1}$, and by performing a discrete Fourier transform on the series $e_m=d_{m+k,k}$ satisfying $z'_n=\Sigma e_{n-k}y_k$ for signals to be restored $z'_n$ expressed by $z'_n=\Sigma d_{nk}y_k$ from the components $d_{nk}$ of the matrix D and the reproduced signals $y_k$. This apparatus further includes calculating means for calculating, for the power spectrum generated by the spectrum analyzer, a signal-to-noise ratio by taking as the denominator a value obtained by adding values obtained by multiplying each frequency component of the power spectrum by the square of the function $E_f$, excluding the vicinities of the frequency $f_s$ and harmonics thereof, and as the numerator a value of the power spectrum at the frequency $f_s$ multiplied by the square of the value of the function $E_f$ at the frequency $f_s$. In this second aspect of the invention, the recording circuit preferably comprises a digital to analog converter. The storage means and the calculating means may be implemented in software running on a microcomputer.

For either of the above discussed embodiments of the disclosed magnetic recording medium evaluation apparatus, a method for estimating the coefficients $a_{nk}$ is to measure the signal intensities when signals are recorded at at least two linear recording densities and reproduced, and estimate the coefficients $a_{nk}$ based on the differences in the reproduced signal intensities at the linear recording densities.

Another aspect of the disclosed invention is a method for evaluation of a magnetic recording medium, having a step of rotating the magnetic recording medium; a step of positioning a magnetic recording/reproduction head above the magnetic recording medium; a step of generating arbitrary recording signals $x_n$; a step of processing the recording signals $x_n$ for recording on the magnetic recording medium using the magnetic recording/reproduction head; and a step of processing, at a fixed sampling interval in synchronization with the recording signals $x_n$, signals acquired from the magnetic recording medium using the magnetic recording/reproduction head, to produce reproduced signals $y_k$. In addition, this method includes a step of filtering the recorded signals $x_n$ to produce ideal restored signals $z_n$, and a step of filtering the reproduced signals $y_k$ to produce restored signals $z'_n$. In the step producing ideal restored signals $z_n$, the recording signals $x_n$ are acquired, and for ideal restored signals $z_n$ which are to be restored when the recording signals $x_n$ are recorded, ideal restored signals $z_n$ are generated based on the relationship $z_n=\Sigma c_{nk}x_k$. In the step producing restored signals $z'_n$, the reproduced signals $y_k$ are acquired, the relationship $y_n=\Sigma a_{nk}x_k$ between the previously sampled reproduced signals $y_k$ and the recording signals $x_n$ is determined, an inverse matrix $B=A^{-1}$ of a square matrix A the components of which are the coefficients $a_{nk}$ is calculated, and restored signals $z'_n$ are produced based on the relationship of the restored signals $z'_n=\Sigma d_{nk}y_k$ from the components of a matrix $D=CA^{-1}$ obtained by multiplying from the right a matrix C the components of which are the coefficients $c_{nk}$ by a matrix $B=A^{-1}$. Further, the method has a step of calculating a signal-to-noise ratio by taking an average of the absolute value of the difference between the ideal restored signals $z_n$ and the restored signals $z'_n$, as the denominator, and the amplitude of the ideal restored signals $z_n$, as the numerator. Preferably, the step of processing the recording signals $x_n$ for recording comprises a digital to analog conversion, and the step of processing signals acquired from the magnetic recording medium comprises an analog to digital conversion synchronized with the recording signals $x_n$.

A further aspect of the disclosed invention is a method for evaluation of a magnetic recording medium, having a step of rotating the magnetic recording medium; a step of positioning a magnetic recording/reproduction head above the magnetic recording medium; and a step of generating square-wave signals at an arbitrary frequency $f_s$. In addition, this aspect of the invention has a step of processing the square-wave signals at frequency $f_s$ for recording on the magnetic recording medium using the magnetic recording/reproduction head, and a step of performing frequency analysis of reproduced signals $y_k$ reproduced from the magnetic recording medium by the magnetic recording/reproduction head, and generating the power spectrum of the waveform of the reproduced signals $y_k$. Further, the method has a step of storing a function $E_f$ obtained, when the relationship between the recording signals $x_n$ and signals to be restored $z_n$ is expressed by $z_n=\Sigma c_{nk}x_k$, and the relationship between the reproduced signals $y_k$ and the recording signals $x_n$ is expressed by $y_n=\Sigma a_{nk}x_k$, by calculating a matrix B which has $b_{nk}$ as components and which is an inverse matrix $B=A^{-1}$ of a square matrix A the components of which are the coefficients $a_{nk}$, multiplying from the right a matrix C the components of which are coefficients $c_{nk}$ by a matrix $B=A^{-1}$ to determine a matrix $D=CA^{-1}$, and by performing a discrete Fourier transform on the series $e_m=d_{m+k,k}$ satisfying $z'_n=\Sigma e_{n-k}y_k$ for signals to be restored $z'_n$ expressed by $z'_n=\Sigma d_{nk}y_k$ from the components $d_{nk}$ of the matrix D and the reproduced signals $y_k$, and a step of calculating, for the power spectrum, a signal-to-noise ratio by taking as the denominator a value obtained by adding values obtained by multiplying each frequency component of the power spectrum by the square of the function $E_f$, excluding the vicinities of the frequency $f_s$ and harmonics thereof, and as the numerator a value of the power spectrum at the frequency $f_s$ multiplied by the square of the value of the function $E_f$ at the frequency $f_s$. Preferably, the step of processing the square-wave signals at frequency $f_s$ for recording comprises a digital to analog conversion.

For either of the above discussed magnetic recording medium evaluation methods, a method for estimating the coefficients $a_{nk}$ is to measure the signal intensities when signals are recorded at at least two linear recording densities and reproduced, and estimate the coefficients $a_{nk}$ based on the differences in the reproduced signal intensities at the linear recording densities.

By means of this invention, magnetic recording medium evaluation is possible which provides good correlation with the error rate even when comparing media with different structures, without requiring sophisticated signal processing circuitry of limited applicability, as is required for error rate measurements.

DESCRIPTION OF THE PREFERRED EMBODIMENTS

Figure 1:
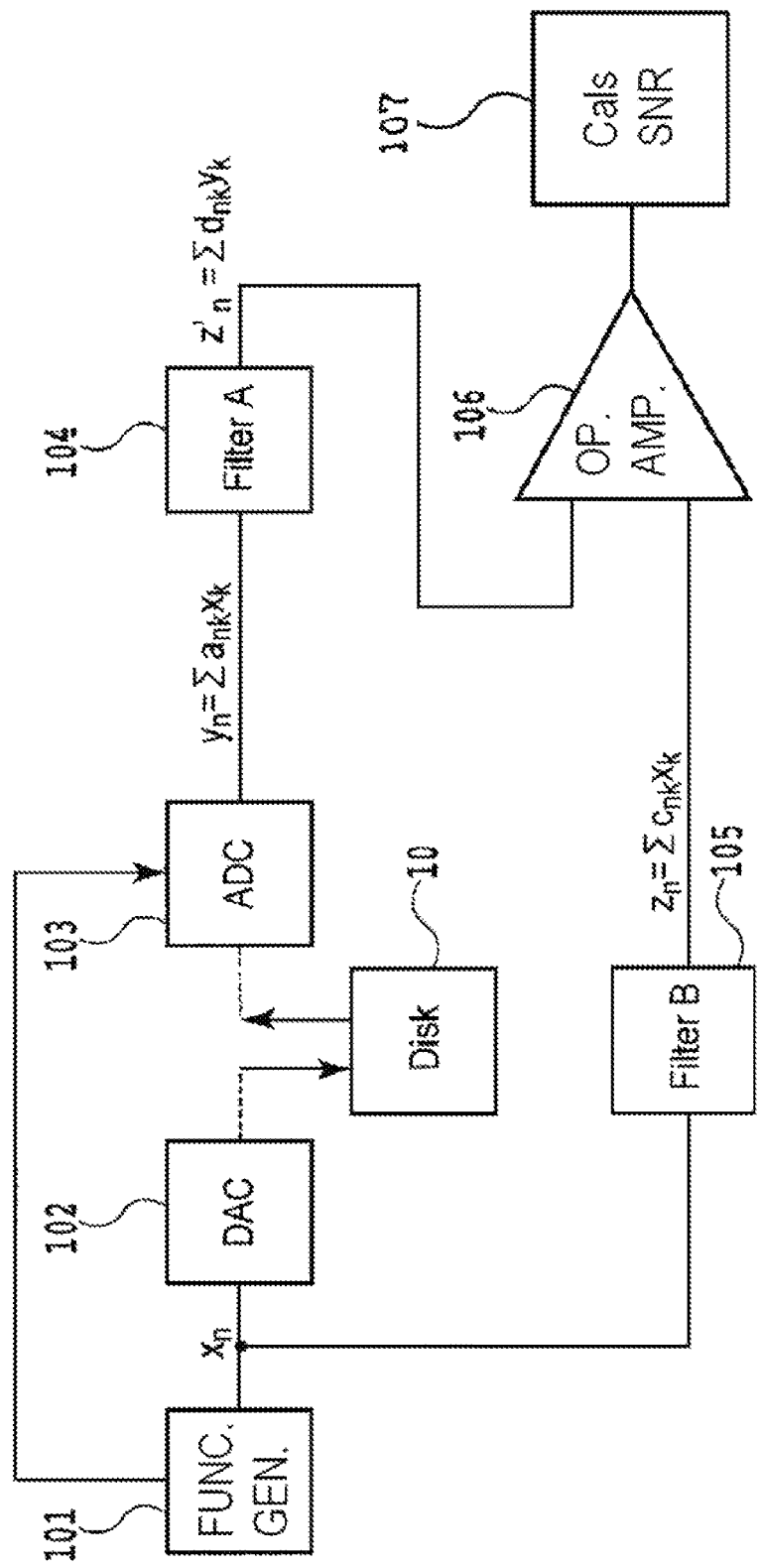
FIG. 1 shows the configuration of the magnetic recording medium evaluation apparatus according to the first aspect of the invention.

Below, aspects of the invention are explained in detail, referring to the drawings. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

(Aspect 1)

FIG. 1 shows in simplified block diagram form the configuration of the magnetic recording medium evaluation apparatus according to Aspect 1 of the invention. To evaluate a hard disk magnetic recording medium 10, the apparatus includes a spin stand (not shown) which rotates the magnetic recording medium 10, a magnetic recording/reproduction head (not shown), and a mechanism (not shown) to position the magnetic recording/reproduction head above the magnetic recording medium 10. Arbitrary signals $x_n$ are generated by a function generator 101 and are digital to analog converted by a head amplifier DAC (digital to analog converter) 102, and the resulting signals are recorded in the magnetic recording medium 10 to be measured by the magnetic recording/reproduction head. In addition, accurate restored signals $z_n$ are obtained from the recording signals output from the function generator 101 via the digital filter B 105. Reproduced signals recorded in the magnetic recording medium 10 are acquired by the recording/reproduction head and sampled by the head amplifier ADC (analog to digital converter) 103 in synchronization with a synchronization signal output from the function generator 101, and the discrete signals obtained, $y_n$, are passed through the digital filter A 104 to obtain the restored signals $z'_n$. By inputting to an operational amplifier 106 the outputs of the filter A 104 and the filter B 105, the difference between the restored signal which is the output of the filter A 104 and the ideal restored signal which is the output of the filter B 105 is obtained for each sampling of the reproduced signal. A computation unit 107 computes a signal-to-noise ratio by taking an average of the absolute value of this difference from the operational amplifier as the denominator, and the ideal restored signal intensity as the numerator. The signal-to-noise ratio is used to evaluate signal quality.

In this aspect of the invention, the filter B 105 is represented by coefficients $c_{nk}$ which satisfy the relationship $z_n = \Sigma c_{nk} x_k$ for signals $z_n$ which are to be restored when arbitrary recording signals $x_n$ are recorded.

Further, the filter A 104 is represented by coefficients $d_{nk}$ which, when the relationship $y_n = \Sigma a_{nk} x_k$ between reproduced signals $y_n$ and recording signals $x_n$ is determined in advance, and the matrix $B = A^{-1}$ which is the inverse matrix of the square matrix A the components of which are $a_{nk}$, that is, the matrix B the components of which are the coefficients $b_{nk}$ satisfying the relationship $x_n = \Sigma b_{nk} y_k$ is computed, are the components of the matrix $D = CA^{-1}$ obtained by multiplying from the right the matrix C the components of which are the coefficients $c_{nk}$ by the matrix $B = A^{-1}$, that is, the components of matrix D satisfy the relationship $z'_n = \Sigma d_{nk} y_k$.

The filter A 104, the filter B 105, the operational amplifier 106, and the computation unit 107 may be provided as software installed in a microcomputer or similar equipment, or another apparatus having equivalent functions can be substituted.

Figure 2:
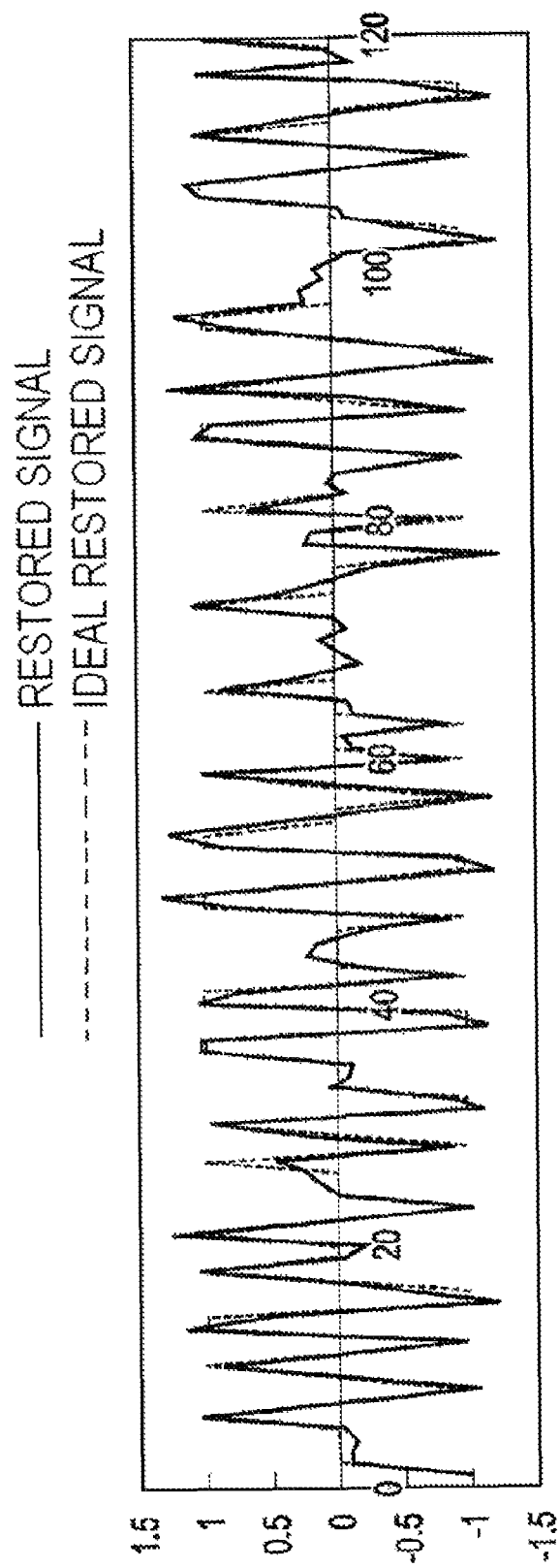
FIG. 2 is a graph showing, for each sampling of the recorded signal in the apparatus of FIG. 1, the ideal restored signal output from a first filter when reproduced from recording at 1200 kfci, using a perpendicular recording head and perpendicular magnetic recording medium, and the restored signal resulting from processing of the reproduced signal by a second filter.

FIG. 2 is a graph showing, for each sampling of the reproduced signal, the ideal restored signal output from the filter B 105 (dashed plot) when reproduced from recording at 1200 kfci, using a perpendicular recording head and perpendicular magnetic recording medium, and the restored signal resulting from processing of the reproduced signal by the filter A 104 (solid plot). Here, the computation to obtain the ideal restored signals from the recording signals is $c_{n,n+1} = 1$, $c_{n,n-1} = -1$, and all other coefficients are 0. The ideal restored signal output has the three values 1, 0, −1, and the signal quality is evaluated by comparing the output from the filter A at each point with the ideal restored signal output from the filter B.

(Aspect 2)

Figure 3:
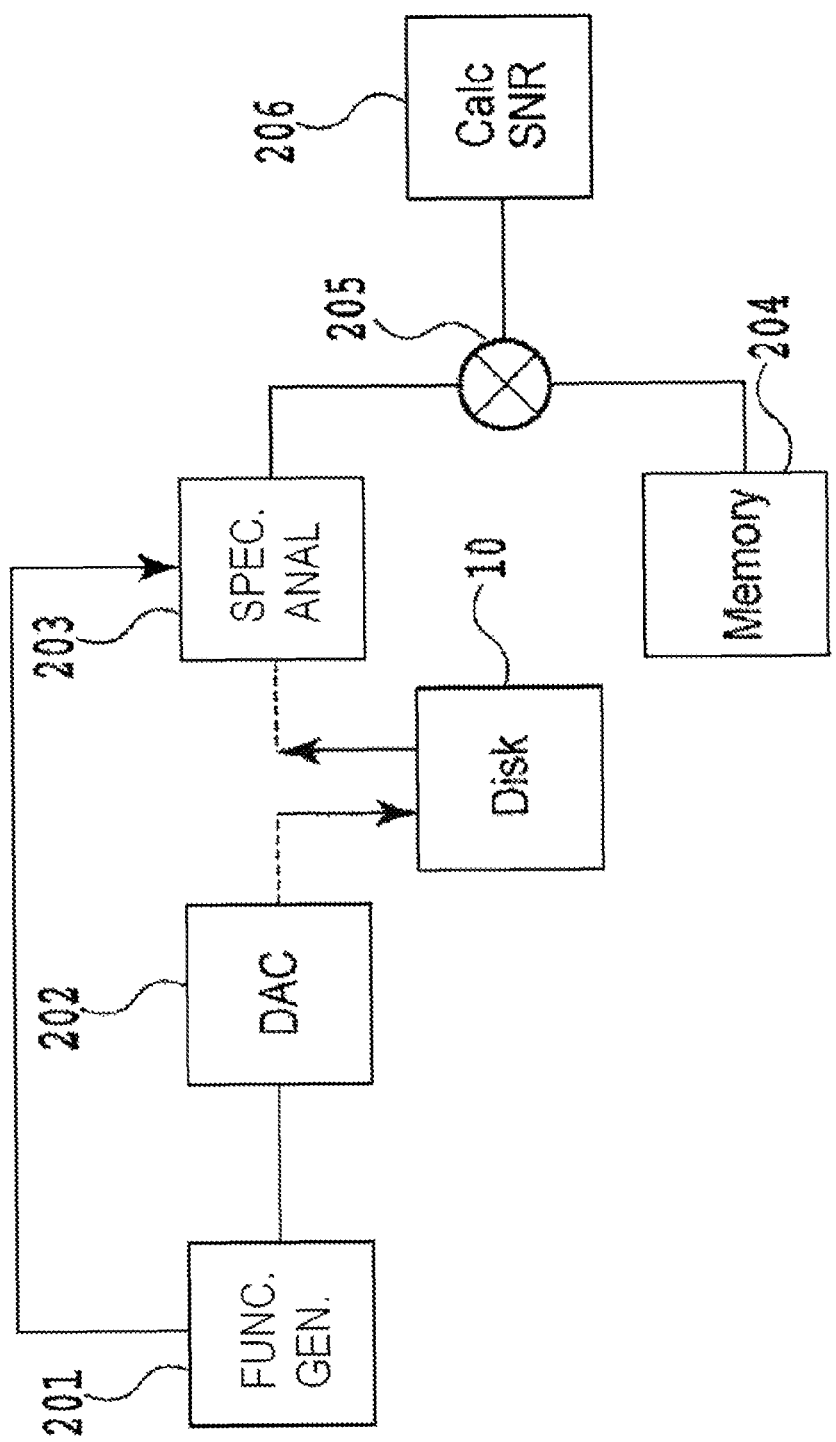
FIG. 3 is a block diagram illustrating the magnetic recording medium evaluation apparatus of the second aspect of the invention.

FIG. 3 is a block diagram illustrating the magnetic recording medium evaluation apparatus of Aspect 2 of the invention. To evaluate a hard disk magnetic recording medium 10, the apparatus includes a spin stand (not shown) which rotates the magnetic recording medium 10, a magnetic recording/reproduction head (not shown), and a mechanism (not shown) to position the magnetic recording/reproduction head above the magnetic recording medium 10. Square-wave signals at an arbitrary frequency $f_s$ are generated by the function generator 201, are D-to-A converted by the head amplifier DAC 202, and are recorded as signals in the magnetic recording medium being measured 10 by the magnetic recording/reproduction head. A power spectrum is determined by a spectrum analyzer 203 from signals reproduced using the magnetic recording/reproduction head from the signals recorded in the magnetic recording medium 10. Also, a function $E_f$ relating to frequency is prepared in advance and stored in memory 204, and a value obtained by an adder 205 by multiplying the above power spectrum by the square of the function $E_f$ is sent to a computation unit 206. The computation unit 206 calculates the signal-to-noise ratio by taking the value obtained by addition, excluding the vicinities of the frequency $f_s$ and harmonics thereof, as the denominator, and the value of the power at the frequency $f_s$ multiplied by the square of $E_f$ at the frequency $f_s$, as the numerator.

The memory 204, adder 205, and computation unit 206 may be provided as software installed in a microcomputer or similar equipment, or another apparatus having equivalent functions can be substituted.

For this aspect of the invention, the function $E_f$ relating to frequency is explained. First, when the relationship between arbitrary recording signals $x_n$ and the signals to be restored $z_n$ is expressed as $z_n = \Sigma c_{nk} x_k$, and the relationship between the reproduced signals $y_k$ and the recording signals $x_n$ is expressed as $y_n = \Sigma a_{nk} x_k$, the inverse matrix $B = A^{-1}$ of the square matrix A, the components of which are the coefficients $a_{nk}$, that is, the matrix B the components of which are the coefficients $b_{nk}$ in the relationship $x_n = \Sigma b_{nk} y_k$, is calculated. Next, the matrix $D = CA^{-1}$ is obtained by multiplying from the right the matrix C, the components of which are the coefficients $c_{nk}$, by the matrix $B = A^{-1}$. Using the components $d_{nk}$ of this matrix D, signals $z'_n$ to be restored from the reproduced signals $y_k$ are expressed by $z'_n = \Sigma d_{nk} y_k$, and by performing a discrete Fourier transform of the series $e_m=d_{m+k,k}$ satisfying $z'_n=\Sigma e_{n-k}y_k$ for the signals to be restored $z'_n$, the function $E_j$ is obtained.

Next, the method of determining the coefficients $a_{nk}$ is explained. Suppose for examine that the signal intensities when square-wave signals are recorded and reproduced at inversion intervals which are 1×, 3×, 5×, and 7× the minimum magnetization inversion intervals are respectively $TAA_1$, $TAA_3$, $TAA_5$, and $TAA_7$. Assuming that intersymbol interference is symmetric, $y_j=a_0*x_j+a_1*x_{j-1}+a_1*x_{j+1}+a_2*x_{j-2}+a_2*x_{j+2}+a_3*x_{j-3}+a_3*x_{j+3}$. Reproduced amplitudes when recording square-wave signals at inversion intervals of 1×, 3×, 5×, and 7× are respectively expressed by $a_0-2a_1+2a_2-2a_3$, $a_0+2a_1-2a_2-2a_3$, $a_0+2a_1+2a_2-2a_3$, and $a_0+2a_1+2a_2+2a_3$; by regarding these as equal to $TAA_1$, $TAA_3$, $TAA_5$, and $TAA_7$, respectively, the coefficients $a_0$ to $a_3$ can be obtained.

Figure 4A:
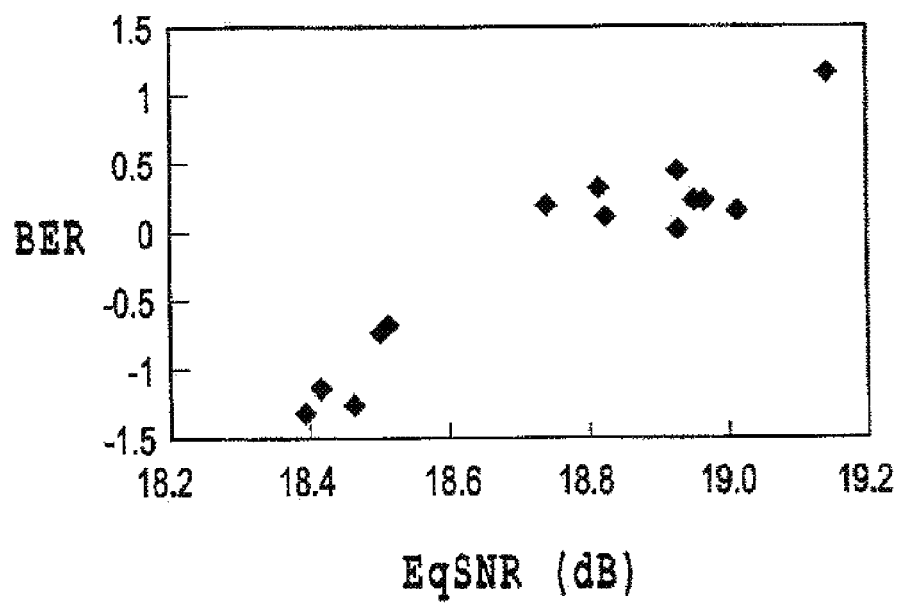
FIG. 4A is a graph showing the correlation between the evaluated SNR and the measured error rate for the method of the second aspect of the invention.
Figure 4B:
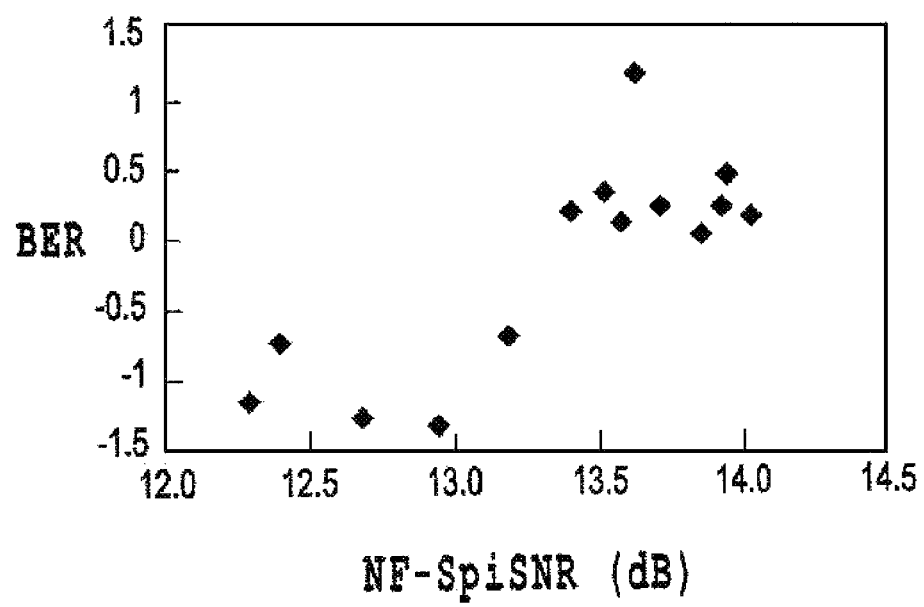
FIG. 4B is a graph showing the correlation between the conventional SpiSNR and the measured error rate.

FIG. 4A and FIG. 4B compare the results when using the method of this aspect of the invention to evaluate perpendicular media with various structures, and the results when using error rates in direct evaluations. In FIG. 4A, a graph is shown of the correlation between the SNR evaluated using the method of this aspect of the invention and the measured error rate. In FIG. 4B, a graph is shown of the correlation between the conventional SpiSNR and the measured error rate. It is clear that the correlation with the error rate is improved in FIG. 4A as compared with FIG. 4B.

One method for estimating the coefficients $a_{nk}$, which is applicable to both embodiments of the magnetic recording medium evaluation apparatus described in this application, is to measure the signal intensities when signals are recorded at at least two linear recording densities and reproduced, and estimate the coefficients $a_{nk}$ based on the differences in the reproduced signal intensities at the linear recording densities.

It will be apparent to one skilled in the art that the manner of making and using the claimed invention has been adequately disclosed in the above-written description of the preferred embodiments taken together with the drawings. It will be understood that the above description of the preferred embodiments of the present invention are susceptible to various modifications, changes and adaptations, and the same are intended to be comprehended within the meaning and range of equivalents of the appended claims.

What is claimed is:

1. An apparatus for evaluation of a magnetic recording medium, the apparatus comprising:
    a spin stand which rotates the magnetic recording medium;
    a magnetic recording/reproduction head;
    a mechanism to position the magnetic recording/reproduction head above the magnetic recording medium;
    a signal generator for generating arbitrary recording signals $x_n$;
    a recording circuit which processes the recording signals $x_n$ for recording on the magnetic recording medium using the magnetic recording/reproduction head;
    a reproduction circuit for providing, as reproduced signals $y_k$, signals acquired from the magnetic recording medium using the magnetic recording/reproduction head, at a fixed sampling interval in synchronization with the recording signals $x_n$;
    a first digital filter to which the recording signals $x_n$ are input, and which outputs ideal restored signals $z_n$ when the recording signals $x_n$ are recorded;
    a second digital filter to which the reproduced signals $y_k$ are input, and which outputs restored signals $z'_n$;
    comparison means for determining the difference between the output $z_n$ of the first digital filter and the output $z'_n$ of the second digital filter; and
    calculating means for calculating a signal-to-noise ratio by taking an average of the absolute value of the difference determined by the comparison means as the denominator, and the amplitude of the ideal restored signals $z_n$, as the numerator.

2. The apparatus according to claim 1, wherein the first digital filter is represented by coefficients $c_{nk}$ satisfying the relationship $z_n=\Sigma c_{nk}x_k$, and
    wherein the second digital filter is represented by coefficients $d_{nk}$ satisfying the relationship $z'_n=\Sigma d_{nk}y_k$, the coefficients $d_{nk}$ being the components of a matrix $D=CA^{-1}$ obtained by determining the relationship $y_n=\Sigma a_{nk}x_k$ between the previously sampled reproduced signals $y_k$ and the recording signals $x_n$, calculating an inverse matrix $B=A^{-1}$ of a square matrix A the components of which are the coefficients $a_{nk}$, and multiplying from the right a matrix C the components of which are the coefficients $c_{nk}$, by the matrix $B=A^{-1}$.

3. The apparatus according to claim 1, wherein the recording circuit comprises a digital to analog converter, and the reproduction circuit comprises an analog to digital converter synchronized with the signal generator.

4. The apparatus according to claim 1, wherein the comparison means comprises an operational amplifier.

5. The apparatus according to claim 1, wherein the first digital filter and the second digital filter are implemented in software running on a microcomputer.

6. The apparatus according to claim 2, wherein the signal intensities are measured when signals are recorded at at least two linear recording densities and reproduced, and the coefficients $a_{nk}$ are estimated based on the differences in the reproduced signal intensities at the linear recording densities.

7. A method for evaluation of a magnetic recording medium, the method comprising the steps of:
    rotating the magnetic recording medium;
    positioning a magnetic recording/reproduction head above the magnetic recording medium;
    generating arbitrary recording signals $x_n$;
    processing the recording signals $x_n$ for recording on the magnetic recording medium using the magnetic recording/reproduction head;
    processing, at a fixed sampling interval in synchronization with the recording signals $x_n$, signals acquired from the magnetic recording medium using the magnetic recording/reproduction head, to produce reproduced signals $y_k$;
    filtering the recording signals $x_n$ to produce ideal restored signals $z_n$ when the recording signals $x_n$ are recorded;
    filtering the reproduced signals $y_k$, to produce restored signals $z'_n$; and
    calculating a signal-to-noise ratio by taking an average of the absolute value of the difference between the ideal restored signals $z_n$ and the restored signals $z'_n$, as the denominator, and the amplitude of the ideal restored signals $z_n$, as the numerator.

8. The method according to claim 7, wherein the step of processing the recording signals $x_n$ for recording comprises a digital to analog conversion, and the step of processing signals acquired from the magnetic recording medium comprises an analog to digital conversion synchronized with the recording signals $x_n$.

9. The method according to claim 7, wherein the step of filtering the recording signals $x_n$ to produce ideal restored signals $z_n$, is based on the relationship $z_n = \Sigma c_{nk} x_k$, and wherein the step of filtering the reproduced signals $y_k$, to produce restored signals $z'_n$, is based on the relationship $z'_n = \Sigma d_{nk} y_k$, the coefficients $d_{nk}$ being components of a matrix $D = CA^{-1}$ obtained by determining the relationship $y_n = \Sigma a_{nk} x_k$ between the previously sampled reproduced signals $y_k$ and the recording signals $x_n$, calculating an inverse matrix $B = A^{-1}$ of a square matrix A the components of which are the coefficients $a_{nk}$, and multiplying from the right a matrix C the components of which are the coefficients $c_{nk}$ by a matrix $B = A^{-1}$.

10. The method according to claim 8, wherein the signal intensities are measured when signals are recorded at at least two linear recording densities and reproduced, and the coefficients $a_{nk}$ are estimated based on the differences in the reproduced signal intensities at the linear recording densities.

* * * * *